(12) United States Patent
Vahee et al.

(10) Patent No.: US 7,788,118 B1
(45) Date of Patent: Aug. 31, 2010

(54) PROJECT MANAGEMENT METHOD AND SYSTEM

(75) Inventors: Gerard Vahee, Paris (FR); David M. Harris, Great Missenden (GB); Jan Heisterberg-Andersen, Gentofte (DK)

(73) Assignee: International Business Machines Corporation, Armonk, NY (US)

( * ) Notice: Subject to any disclaimer, the term of this patent is extended or adjusted under 35 U.S.C. 154(b) by 1536 days.

(21) Appl. No.: 09/660,852

(22) Filed: Sep. 13, 2000

(51) Int. Cl.
*G06F 17/50* (2006.01)
(52) U.S. Cl. .................... 705/7; 705/10; 705/1; 705/27
(58) Field of Classification Search .................... 705/1, 705/7, 8–9, 10, 27, 30; 707/102
See application file for complete search history.

(56) References Cited

U.S. PATENT DOCUMENTS

| | | | | |
|---|---|---|---|---|
| 5,708,825 A * | 1/1998 | Sotomayor | ............... | 715/501.1 |
| 5,721,913 A | 2/1998 | Ackroff et al. | ............... | 395/614 |
| 5,734,890 A * | 3/1998 | Case et al. | ............... | 707/5 |
| 5,799,286 A | 8/1998 | Morgan et al. | ............... | 705/30 |
| 5,864,180 A | 1/1999 | Ladd | ............... | 364/188 |
| 6,009,407 A * | 12/1999 | Garg | ............... | 705/10 |
| 6,092,050 A * | 7/2000 | Lungren et al. | ............... | 705/36 R |
| 6,286,005 B1 * | 9/2001 | Cannon | ............... | 707/100 |
| 6,411,936 B1 * | 6/2002 | Sanders | ............... | 705/10 |
| 6,484,149 B1 * | 11/2002 | Jammes et al. | ............... | 705/26 |
| 6,611,840 B1 * | 8/2003 | Baer et al. | ............... | 707/102 |
| 6,763,496 B1 * | 7/2004 | Hennings et al. | ............... | 715/501.1 |
| 2001/0028364 A1 * | 10/2001 | Fredell et al. | ............... | 345/751 |
| 2002/0032677 A1 * | 3/2002 | Morgenthaler et al. | ............... | 707/3 |

OTHER PUBLICATIONS

Design and implementation of an Internet-based time management system by (Egbert, Lawrence Garth, M. Eng., University of Louisville, 1990, 70 pages; AAT1396751).*
Computer Associates Announces General Availability of Ingres II Relational Database Management System for Linux by PR Newswire. New York: Feb 2, 2000. p. 1.*
Inovie Software Announces Availability of TeamCenter on Oracle8 and Netware 5 by Business Editors Novell Brainshare 99.Business Wire. New York: Mar. 22, 1999. p. 1.*
M. Song & M. Montoya-Weiss, "Critical Development Activities for Really New Versus Incremental Products," J. Prod. Innov. Manag. vol. 15, No. 2, Mar. 1998 p. 124-135.

* cited by examiner

*Primary Examiner*—Vanel Frenel
(74) *Attorney, Agent, or Firm*—John Pivnichny

(57) ABSTRACT

A project management method and system provides process definition and relationship definition. Work patterns link steps with process listings in a series of useful scenarios for project management. Work product documents provide guidance to a project manager. A system may be entered either through a work pattern group or a domain of topic areas.

9 Claims, 3 Drawing Sheets

PROJECT MANAGEMENT METHOD AND SYSTEM

TECHNICAL FIELD

The invention relates generally to management of projects in a company or other organization. More specifically, the invention is concerned with a method, system, tool, and computer program product for performing project management of one or more projects involving a plurality of process listings, work patterns, and links throughout the process listings.

BACKGROUND OF THE INVENTION

Efficient management of projects in a company or other organization is an increasing problem as the number and complexity of projects increases. An individual project may for example be directed to development of a product for sale by a company and involve a large number e.g. >100 activities, herein called processes. It is therefore desirable that some system or method be used to monitor, regulate, control, and coordinate the various processes in a beneficial manner. The overall objective may be to accelerate a product development schedule or maximize efficiency of resource utilization, minimize development cost, resulting product cost or any other defined criteria.

Ladd, in U.S. Pat. No. 5,864,480 describes a system, method, and computer programs for assisting a user through the process of developing an electronic product and/or documentation. The system uses a computer with a monitor and memory. Stored in the memory is an electronic representation of a product to be developed and a process for the development of the product. The electronic representation of the process includes a process lifecycle tree divided into phase realization subtrees. Each subtree has elements such as a document, a deliverable, a milestone, a decision point, or a schedule. The user interacts with the tree and subtrees using programs executed on a computer to control product development.

Song and Montoya-Weiss in their paper entitled "Critical Development Activities for Really New Versus Incremental Products," published in the Journal of Prod. Innov. Manag., vol. 15, no. 2, March 1998, p. 124-135 describe product development activities for both new and incremental products. They describe a model linking new product profitability to the proficiency level of activities (processes). The model suggests when and on what processes, project management should concentrate resources to achieve higher levels of success.

A project may be directed to production of products or providing services rather than product development. Morgan et al. in U.S. Pat. No. 5,799,286 describe an automated activity-based method and system for managing a business organization. A user at a computer workstation enters activity information. The system automatically downloads and stores accounting information associated with the activities in a relational database along with the activity information. A database server maps expenses to the various activities and may generate reports to use in managing the project.

Ackroff et al in U.S. Pat. No. 5,721,913 describe a system and method for managing the workflow of activities in a business organization. The system is computer-based and includes an information database of data records for independent activities. Data objects are linked dependent upon the type of activity to be managed, and data records contain attribute information for the linked data objects. Activities are then controlled by controlling processing of the attribute information within each data record.

Various tools herein called technical methods have been developed for implementing a solution once the desired processes and relationships are known. Microsoft Project 2000 available from the Microsoft Corp. Redmond Wash. and PM Office available from Systemcorp®, Systemcorp is a registered trademark of Systemcorp, Inc. of Montreal Canada, are examples of such tools.

All of the aforementioned methods and tools have limitations for general use because the important steps of process definition and relationship definition are not addressed. It would therefore be a desirable goal to provide an improved project management method and system capable of handling these important parts of project management, and be capable of employment across a much broader range of project types. It is believed that such a method and system would constitute a significant advancement in the art.

OBJECTS AND SUMMARY OF THE INVENTION

It is therefore a principal object of the present invention to enhance the project management art by providing a process for managing projects with enhanced capabilities.

It is another object to provide a business process for transferring a business need into a strategy for providing a solution to the need by building a project management tool and operating the tool to provide the solution.

It is a further object to provide a system and a tool for project management having enhanced capabilities.

It is yet another object to provide a computer program product with enhanced capability for managing a project.

These and other objects are attained in accordance with one embodiment of the invention wherein there is provided a process for managing a project, comprising the steps of, building a project management data model having entities and relationships described by text and graphical data, entering the project management data model in a relational database, building a project management tool having web pages from the text and graphical data, generating hyperlinks in the web pages of the tool based on the relationships in the relational database, and using the tool to manage the project.

In accordance with another embodiment of the invention there is provided a project management tool, comprising, a plurality of process listings, each process listing providing guidance about how to undertake an activity, a plurality of work patterns, each work pattern describing a response to a project management situation and having threads throughout the plurality of process listings, a plurality of work product documents linked to the plurality of process listings, the documents describing items used to manage a project, word processor templates for the work product documents describing plans, procedures, and records, and procedures for the process listings.

In accordance with another embodiment of the invention there is provided a computer program product for instructing a processor to provide a method of project management, the computer program product comprising, a computer readable medium, first program instruction means for building a project management data model having entities and relationships described by text and graphical data, second program instruction means for entering the project management data model in a relational database, third program instruction means for building a project management tool comprising web pages from the text and graphical data, fourth program instruction means for generating hyperlinks in the web pages of the tool based on the relationships in the relational database, and fifth program instruction means for using the tool to manage the project, and wherein all the program instruction means are recorded on the medium.

BEST MODE FOR CARRYING OUT THE INVENTION

For a better understanding of the present invention, together with other and further objects, advantages and capabilities thereof, reference is made to the following disclosure and the appended claims in connection with the above-described drawings.

Figure 1:
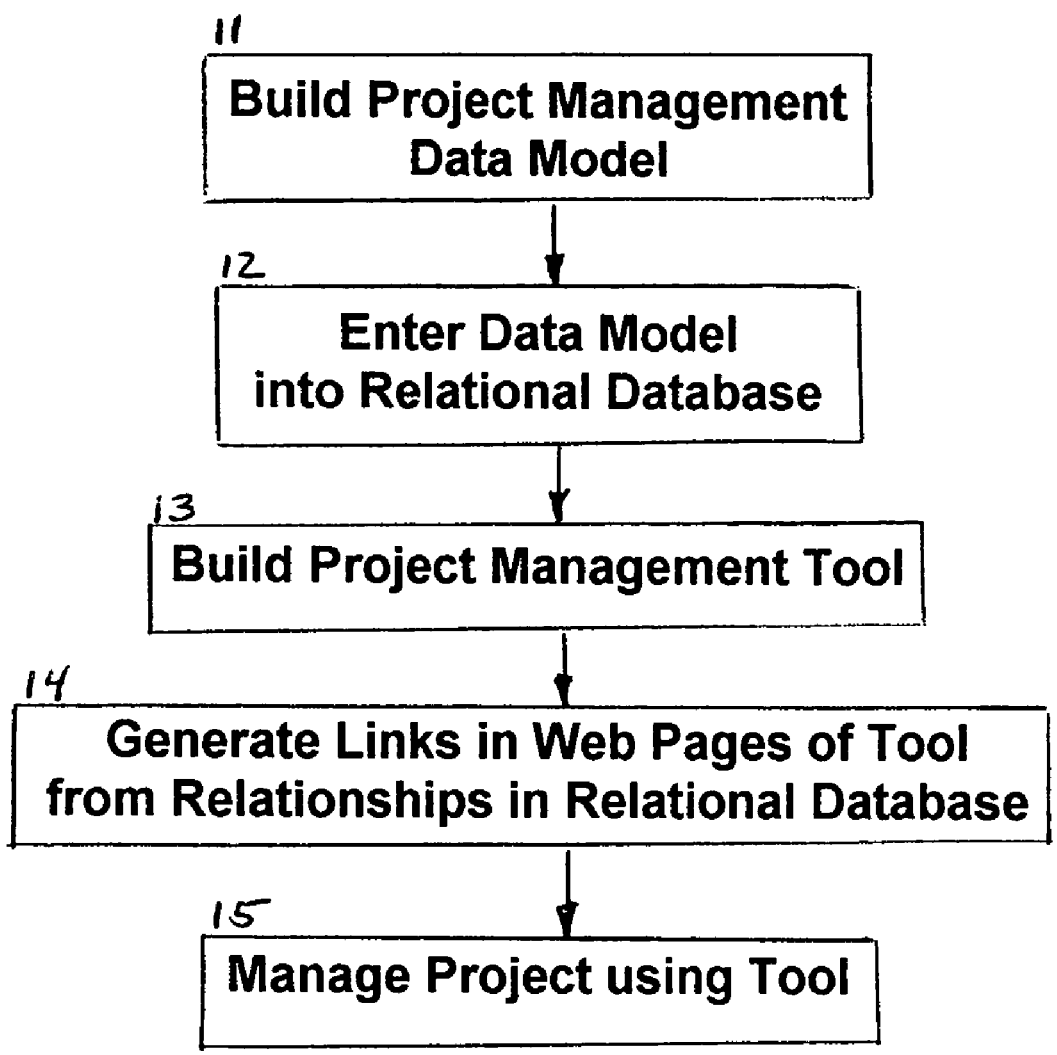
FIG. 1 is a flowchart of a process for managing a project in accordance with one embodiment of the invention.

In FIG. 1 there is shown a flowchart of steps depicting a process for managing a project. Although shown for convenience of understanding as a sequence with arrows between steps, that is not to imply that a particular step can not be started before another is completed. In fact there is no sequential limitation between the steps in any embodiment of the invention other than as may be required by a corresponding appended claim below.

In step 11 a project management data model is built. The data model has entities and relationships (not shown) which may be described by text and graphical data. Text data may be in any form known for recording text including hardcopy, word processor data, or an audio recording of spoken text. Graphical data may include printed graphs, figures, and photographs, or it may also include digitized graphical data using any known format such as bit map (BMP), Joint Photographics Expert Group (JPEG), or any other method of representing graphical data. Graphical data may also include moving data such as animations or motion picture clips, sound clips, or other forms of data known in the art.

In step 12 the text and graphical data is entered into a relational database. Any type of relational database may be used such as DB2® (DB2 is a registered trademark of IBM Corporation). A specially developed relational database may also be used. The relational database preferably includes a data description language (DDL) adapted to use in a project management tool.

One method of inserting the text and graphical data involves use of a parser (not shown). The parser knows the relationships of the data model. The parser reads the text, transforms it to a rich text format (RTF) and adds tags at the beginning and end of text corresponding to the entities which indicate the relationships. Any word processor capable of handling RTF or an equivalent format, such as LOTUS WORD PRO, Lotus Work Pro is a trademark of Lotus Development, Corp. Cambridge, Mass., may be used. The text data may then be automatically stored in the right places, based on the tags, into a relational database using a tool such as Qualiware QLM22 available from QualiWare ApS, P.O. Box 60, Skovlytoften 9B, DK-2840 Holte, Denmark.

In step 13 a project management tool is built having web pages. The web pages are created from the text and graphical data. For example, a web page may contain text presenting a domain 27, what the domain is used for, and a list of sub-domains 28 it contains. The list of sub-domains is created using the relationships between a domain and the sub-domains in the relational database. For each sub-domain a web page presents the sub-domain and the list of processes 21 it contains. Text in a web page results from transforming the corresponding text stored in the relational database.

In step 14, links are added to the web pages based on the relationships in the data model of step 11.

The project is then managed in step 15 using the tool. Managing may include using the guidance and templates included in the tool. It may also include inquiring the tool to determine what actions should be taken to read to an event. It may also include finding detailed explanations of how to periodically (e.g., monthly) report the status of a project.

One way of creating the web pages and adding the links is to use a generator tool (not shown). The generator tool first builds HTML web pages having empty boxes for the text and graphical data, and links. The generator then fills in the boxes with the appropriate text and graphical data from the relational database.

Figure 2:
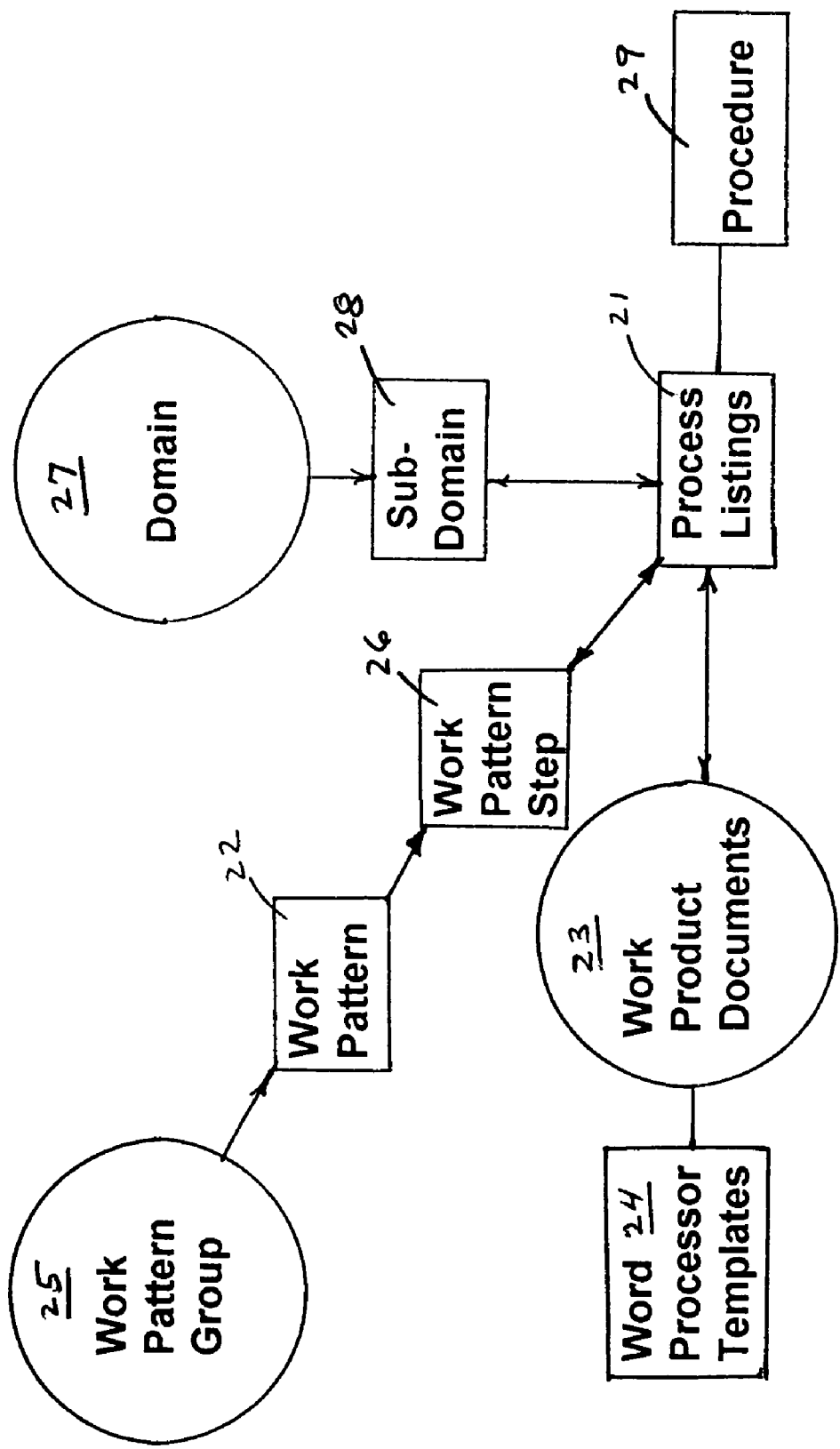
FIG. 2 is a block diagram of a system for managing a project.

In FIG. 2 there is shown a block diagram of a system for project management in accordance with another embodiment of the present invention. A work pattern group 25 has one or more work patterns 22 for the project management methods of defining, planning, starting, monitoring, handling exceptions, handling deliveries, or closing of a project. Each work pattern 22 links processes in a series of useful scenarios such as will be described below in relation to FIG. 3. The work pattern is a set of steps 26 to achieve an activity or reach a goal. The work pattern helps a project manager respond to events and provides a timeline view through domains 27.

Each work pattern step 26 typically includes a 2 or 3 line description of the step referencing one or more process listings 21. Each process listing provides guidance to a project manager in the form of typically 1, 2, or 3 pages of text describing what the project manager should be considering during that step. Some processes are proceduralized by being described by a written procedure 29.

A domain 27 describes project management processes in a series of topic areas such as work plan management, technical environment management, tracking and control, supplier management, sponsor agreement management, risk management, quality management, project definition, human resource management, event management, deliverables management, communications management, or change management. A domain may have sub-domains 28 which then reference the process listings 21.

The system for project management of FIG. 2 also includes work product documents 23 which describe the items such as process inputs and outputs, procedures, plans, reports, forms and logs, a project manager uses to manage a project. Work product documents may include the examples shown below in Table 1.

TABLE 1

Action log
Agreement
Change request
Communications management plan
Deliverable definition
Human resource plan
Issue document
Milestone list
Operational schedule
Organizational breakdown structure (OBS)
Product breakdown structure (PBS)
Project charter
Project definition
Project management schedule TABLE 1-continued Project quality plan
Risk Management Plan
Staff Schedule
Sub-project/team status report
Work breakdown structure (WBS)

A work product document 23 may include a word processor template 24 which can be filled in for the particular project being managed. The word processor templates 24 may then be stored in a hardcopy or on-line in softcopy form of project control book (not shown). Each work product document references and is referenced by one or more process listings 21.

Figure 3:
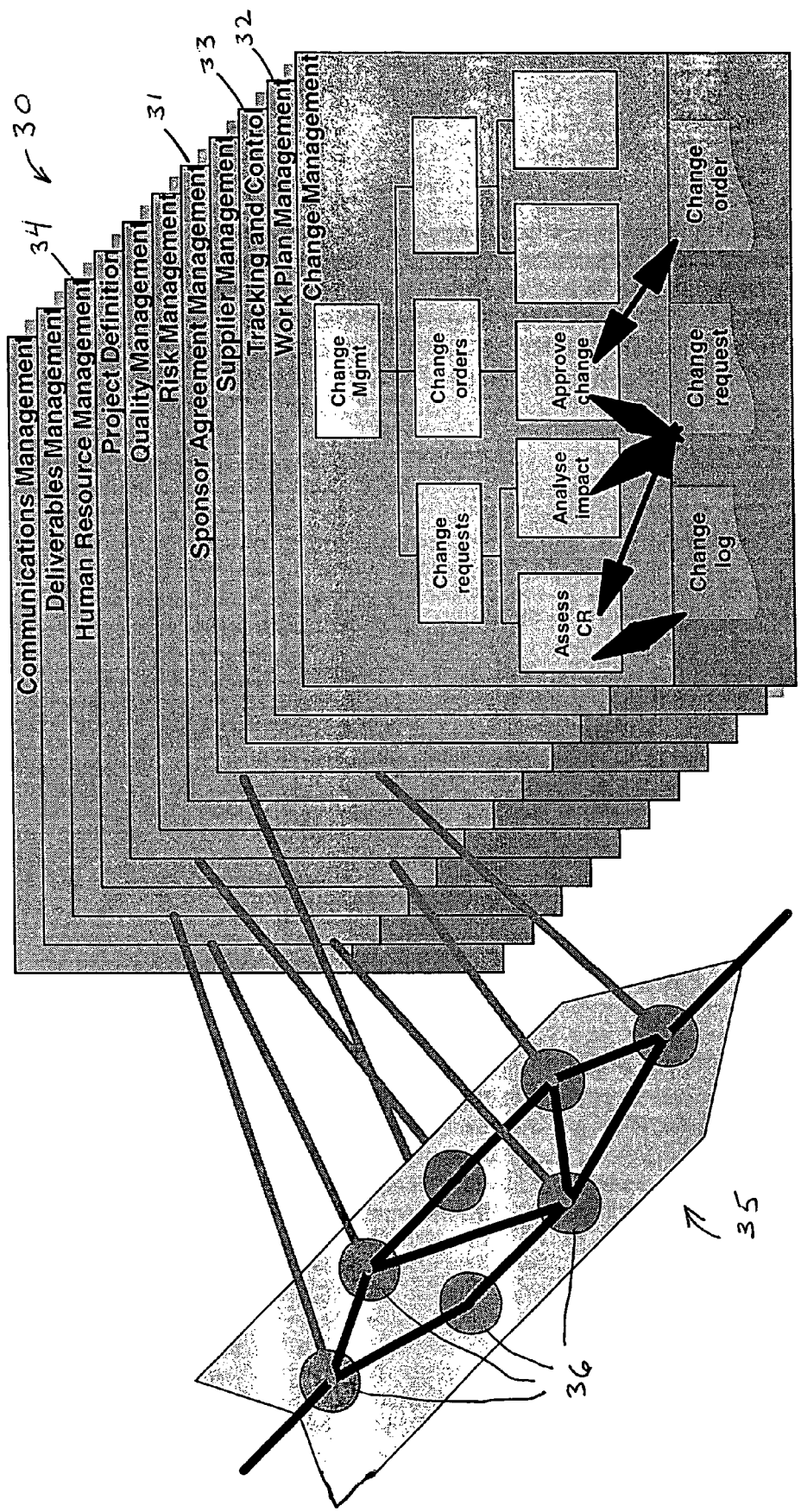
FIG. 3 shows the link between work patterns and processes.

In FIG. 3 there is shown a diagram 30 describing how work patterns 22 and process listings 21 of FIG. 2 are linked. A work pattern 35 includes one or more series of steps 36. Each step 36 references a process listing within a domain such as 31, 32, 33, 34. The work pattern provides the linkage between and may have threads throughout the process listings to achieve the desired activity or goal. A project manager may therefore use the system of FIG. 2 by entering though either the domain 27 or work patterns group elements described above.

While there have been shown and described what are at present considered the preferred embodiments of the invention, it will be obvious to those skilled in the art that various changes and modifications may be made therein without departing from the scope of the invention as defined by the appended claims.

What is claimed is:

1. A computer implemented method for managing a project, comprising the steps of:
   building on said computer a project management data model having entities and relationships described by text and graphical data;
   entering said project management data model in a relational database residing on said computer;
   building on said computer a project management tool for a project for production of a product or providing services, having web pages from said text and graphical data;
   generating on said computer hyperlinks in said web pages of said tool based on said relationships in said relational database; and
   using said tool on said computer to manage said project.

2. The computer implemented method of claim 1, wherein said text includes guidance based on experience.

3. The computer implemented method of claim 1, wherein said text has been entered in a word processor.

4. The computer implemented method of claim 1, wherein said graphical data is entered in an image processing application program.

5. The computer implemented method of claim 1, wherein said project management data model comprises a project definition process, a change management process, a risk management tool, and an issue management tool.

6. The computer implemented method of claim 1, further comprising the step of parsing said text data by adding tags identifying the nature, beginning, and end of said entities described by text data and storing said parsed text data in said relational database.

7. A computer implemented method for transforming a business need into a strategy for providing a solution which meets said need, comprising the steps of:
   defining on said computer said business need, wherein said need is for a process for production of a product or providing services;
   building on said computer in response to said business need, a project management data model having entities and relationships described by text and graphical data;
   entering said project management data model in a relational database residing on said computer;
   building on said computer a project management tool comprising web pages from said text and graphical data;
   generating on said computer hyperlinks in said web pages of said tool based on said relationships in said relational database; and
   operating said tool on said computer to provide a solution which meets said need.

8. A computer system for project management, comprising:
   a project management data model for a project for a process for production of a product or providing services, said model having entities and relationships described by text and graphical data;
   a relational database containing said model;
   a project management tool having web pages generated from said text and graphical data;
   hyperlinks in said web pages of said tool based on said relationships in said relational database; and
   computer means for operating said tool and said data model to manage a project.

9. A computer program product for instructing a processor to provide a method of project management, said computer program product comprising:
   a computer readable medium;
   first program instruction means for building a project management data model for a project for a process for production of a product or providing services, said model having entities and relationships described by text and graphical data;
   second program instruction means for entering said project management data model in a relational database;
   third program instruction means for building a project management tool comprising web pages from said text and graphical data;
   fourth program instruction means for generating hyperlinks in said web pages of said tool based on said relationships in said relational database; and
   fifth program instruction means for using said tool to manage said project; and wherein
   all said program instruction means are recorded on said medium.

* * * * *